United States Patent [19]

Lopresti et al.

[11] Patent Number: 5,734,882
[45] Date of Patent: Mar. 31, 1998

[54] PICTOGRAPHIC BITMAP NAMING OF FILES IN PEN-BASED COMPUTER SYSTEMS

[75] Inventors: Daniel P. Lopresti, Hopewell, N.J.; Andrew Tomkins, Pittsburgh, Pa.

[73] Assignee: Panasonic Technologies, Inc., Princeton, N.J.

[21] Appl. No.: 462,800

[22] Filed: Jun. 5, 1995

Related U.S. Application Data

[63] Continuation of Ser. No. 52,538, Apr. 29, 1993, abandoned.

[51] Int. Cl.$^6$ .................................................. G06F 17/30
[52] U.S. Cl. .......................... 395/600; 364/DIG. 1; 364/282.1; 364/282.3; 364/283.3
[58] Field of Search .......................... 395/600, 800, 395/157; 364/705.06, 709.11; 382/13

[56] References Cited

U.S. PATENT DOCUMENTS

| Re. 34,476 | 12/1993 | Norwood | 382/13 |
|---|---|---|---|
| 5,054,093 | 10/1991 | Cooper et al. | 382/14 |
| 5,063,600 | 11/1991 | Norwood | 382/13 |
| 5,075,896 | 12/1991 | Wilcox et al. | 382/39 |
| 5,159,321 | 10/1992 | Masaki et al. | 340/706 |
| 5,167,016 | 11/1992 | Bagley et al. | 395/144 |
| 5,194,852 | 3/1993 | More et al. | 340/712 |
| 5,309,555 | 5/1994 | Akins et al. | 395/157 |
| 5,319,747 | 6/1994 | Gerrissen et al. | 395/155 |
| 5,335,323 | 8/1994 | Kolnick | 395/164 |
| 5,365,598 | 11/1994 | Sklarew | 382/13 |
| 5,392,447 | 2/1995 | Schlack et al. | 395/800 |
| 5,428,805 | 6/1995 | Morgan | 395/800 |

OTHER PUBLICATIONS

Microsoft Windows User's Guide, Microsoft 1990-92 pp. 12-13, 34-35, 54-55, 126-127.

*Primary Examiner*—Wayne Amsbury
*Attorney, Agent, or Firm*—Amster, Rothstein & Ebenstein

[57] ABSTRACT

A system and method for storage and retrieval of pictographic images as computer file names. Upon generation of an input image, the computer saves the image and extracted spatial and temporal information about the generation of the image. The extracted information can be accessed for comparison, ordering and retrieving of stored pictographic file names and subsequent display to the user. Final selection of the desired name is performed visually by the user while viewing a display of the ordered file names via a document browser.

26 Claims, 4 Drawing Sheets

PICTOGRAPHIC BITMAP NAMING OF FILES IN PEN-BASED COMPUTER SYSTEMS

This is a continuation of application Ser. No. 08/052,538 filed on Apr. 29, 1993, now abandoned.

FIELD OF THE INVENTION

The invention relates generally to the naming of files created using a pen-based computer input device. More specifically, it relates to the storage and retrieval of pen-drawn pictographic file identifiers.

BACKGROUND OF THE INVENTION

Pen-based computer systems, wherein a pen or pen-like input device is used to provide information to a computer, have proliferated in the recent past. Systems, such as the one taught in *The Power of Penpoint* by Robert Carr and Dan Shafer, Addison-Wesley Publishing Co., Inc. (N.Y., 1991) or the system detailed in U.S. Pat. No. 5,159,321 entitled "Pen-Type Computer Input Device" which issued on Oct. 27, 1992 to Masaki, et al., provide a combination of pad, or board, and pen, or pen-like input device, one or each of which is connected to a conventional computer. Input to a computer-generated image on the pad, or input onto a paper version of the computer-resident document which is aligned on the pad, is directly received by the computer. The computer is provided with software for recognition of the input, whether recognizing input to a grid, such as the pattern recognition used for standardized tests, or actual handwriting recognition. Characters written using the pen-pad combination are "translated" into symbols, integers or letters which the recognition software interprets the input to approximate. One example of such a computer system is taught in U.S. Pat. No. 5,060,980, issued Oct. 29, 1991 to Johnson, et al., entitled "Form Utilizing Encoded Indications For Form Field Processing." The Johnson Patent teaches a forms creation and interpreting system employing the recognition of character data (via OCR of alphanumeric characters) and digital data (e.g., digital recognition of blank or filled-in bubbles on a standardized examination answer form). The form carries a computer-generated encoded description of its contents, represented electronically or printed on a hard copy of the form as a barcode, glyph, etc. The encoded description facilitates the interpretation of data entered into the fields of the form, including, for example, instructions to a processor for specific processing of selected data on, or remote from, the form.

Using the pen-based system, one can modify an existing file or create a new file in this manner. The pen-based systems are particularly well-suited for mobile users, given the ease of use and portability of the board and pen peripherals. Editorial changes from remote users in the field frequently have as a goal the communication of a concept rather than the rigid updating of the data structure of the document. As such, handwriting recognition, and consequent computer "translation" is neither appropriate nor necessary. Storage of the actual pen-generated file or document (hereinafter generically referred to as "files"), or of the document name or file name (hereinafter generically referred to as "file names") may, therefore, be preferable for the user's purposes. Ideally, a user-friendly system could store the pen-generated file as generated; store a pictographic, pen-drawn representation as the file name; retrieve the file using a matching scheme to search for the pictographic name; and, if necessary, later invoke a recognition program to translate the file into a representative sequence of alphanumeric characters and/or ASCII values as if originally created using a standard keyboard input device.

When modifying an existing file, file naming protocols do not present a challenge, assuming that the existing file name will remain unchanged, subject only to user verification. Creating new file names requires at least some user knowledge of the computer system in which the file is being stored. Once a user indicates that the created file is to be stored, the computer asks for the name and, in the instance of pen or pen-like input, endeavors to recognize and translate the user input into an appropriate file name. The computer may be programmed to prompt the user with the required ASCII format or suggested names to facilitate the process. Further, some pen-based computing systems create keyboard overlays for simulation of standard input for creating names.

The underlying assumption in these systems is that the computer requires that the file name be a short string of alphanumeric characters rendered in standard ASCII (disc drive/directory/1-8 character file name) format for computer ease of storage, recognition, retrieval and user recall. The requirement that a name conform to a standard computer naming protocol is inherently contradictory to the "user friendly" pen-based input concept wherein, ideally, a minimal amount of computer knowledge is required for use. Moreover, the computer naming standards are, for the average user, neither intuitive nor memorable.

To facilitate retrieval of stored files, several well-known systems have provided users with a bank of icons. Icons are computer-generated pictographic representations of files and directories resident in the computer which icons are more recognizable for the user than ASCII format iterations. The icon consists not only of the graphical portion, but, also includes a textual portion for distinguishing one file from another. Typically, a user does not specify an icon; rather, the computer assigns a predefined icon to the file. The user can only name and/or change the "file name" by input to the textual portion. In essence, therefore, the use of icons is no different from the more established strictly-textual naming protocols.

Clearly, again, the saving of a user-input, mnemonic representation, such as a pen-generated pictograph as a file name would be the most effective means for providing a user friendly and memorable name. Pictographic naming would be preferable to standard text-based approaches in many situations for which text-based naming is inappropriate and/or ineffective. Pens, or pen-like input devices, are not only less expensive and more familiar to users than keyboards, but they are also far more adaptable to needs such as use with languages which are not readily susceptible of keyboard implementation or use with multiple language bases in a single document. Similarly, language-independent systems for multi-national users and text-independent systems for pre-literate or illiterate users favor the use of pictographic naming.

It is, therefore, an objective of the present invention to provide a new file naming system for use with pen-based computing systems.

It is another, more specific, objective of the invention to provide a system for storage, ordering and retrieval of mnemonic representations of files as the names thereof.

It is a further objective of the invention to utilize spatial and temporal information about stored pictographs for retrieval of same.

SUMMARY OF THE INVENTION

These and other objectives are realized by the present invention wherein hand-drawn mnemonic images are saved as names thereof. Upon generation of a hand-drawn image, the computer saves both spatial and temporal information about the generation of the image along with the image itself. The spatial and temporal information related to each stored name, is accessed for search, ordering and retrieval of stored pictographic file names. Final selection of the desired name is performed by the user via display of ordered names using a document browser without resort to a keyboard and without complicated and inaccurate conversion of names to computer representations of recognized character sets.

BRIEF DESCRIPTION OF THE DRAWINGS

The invention will be further detailed with reference to the appended drawings wherein.

DETAILED DESCRIPTION OF THE PREFERRED EMBODIMENT

The present invention provides a system and method for the storage and retrieval of user-input mnemonic file and/or document names (hereinafter generically referred to as "file names") for use with pen-based computing systems. User input mnemonic names will be chosen by the user for ease of his/her recall. To implement the invention, standard input devices capable of capturing the movements of the user are adequate. Standard mouse, tablet pens or light pen input devices can be used along with more advanced devices such as retinal trackers, computer vision systems, head motion sensors or even touch screen input systems. Generally, all of the usable input devices convert the user's movements into a sequence of points, with each point including a location and time component. Further reference to hand-drawn and/or pen input images is clearly meant to encompass all of the foregoing input devices and input therefrom.

The present invention of a system and method for storage and retrieval of pictographic file names utilizes on-line handwriting processing. The on-line handwriting processing of the present invention incorporates the on-line extraction of pen stroke information from an input image, such as is additionally used in existing handwriting recognition systems, but does not involve the translation of the handwritten input to a computer-recognizable character set. Further, the present invention does not require entering of file names according to specified protocols, nor does it require translation of input file names into a computer-recognizable character set. Rather, the system is adapted to store any arbitrary handwritten image as the file name directly, i.e., without translation. For retrieval, the system utilizes at least one matching/comparing scheme which assigns a value to the pictographic name, whether a hash value, a point count integer, a compression image, velocity and/or direction parameters, etc., as will be further discussed herein, and compares that value to the values assigned to other input, and stored, images. Ranking by assigned value then facilitates the ordering and browser display of the retrieved images, which are presumably ranked according to similarity to the input image to be searched.

Figure 1:
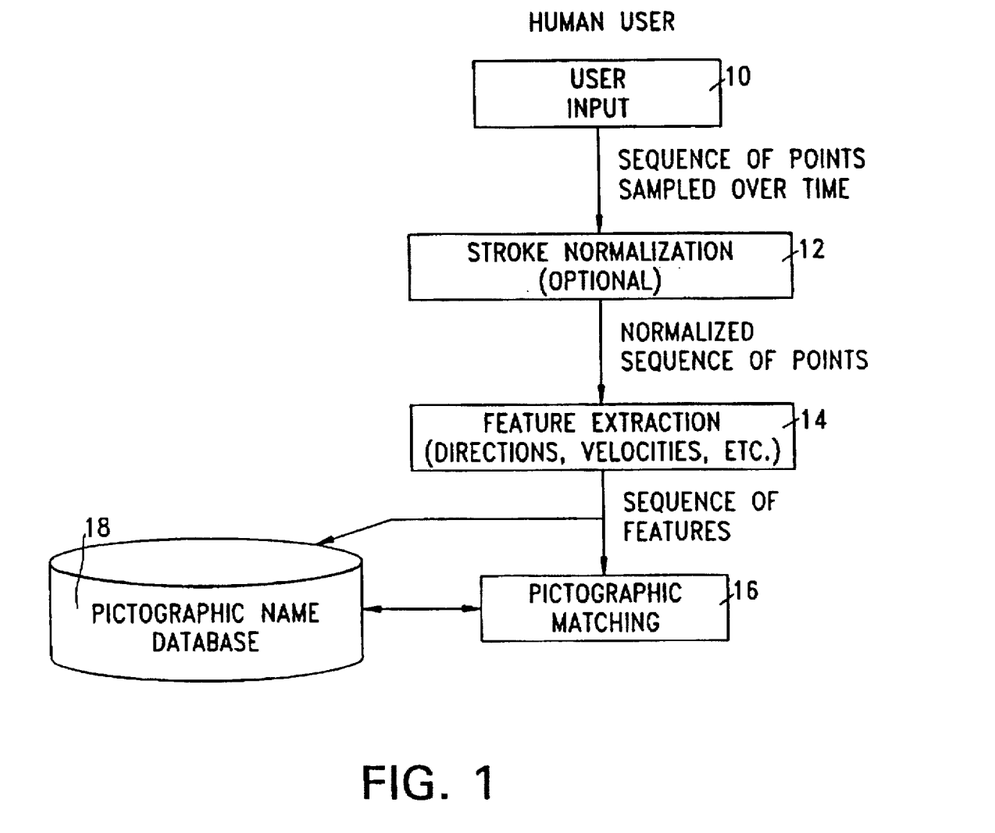
FIG. 1 is a flow chart of representative steps for saving pictographic names.

FIG. 1 illustrates a process flow of the broad functions performed by the computer. User Input, at box 10 of FIG. 1, is the provision of on-line handwriting information to the computer. Those skilled in the are of pen-input computers are aware of on-line handwriting processing as a relatively new technology wherein both spatial and temporal information are extracted virtually instantaneously from the user input. An underlying assumption of the present invention is to extend the set of possible names to include arbitrary bitmaps of a given size, with the semantics of the bitmap left to the discretion of the user. On-line handwriting processing systems or programs provide not only a bitmap of the created image, but also store the x-y coordinates at each moment in time, thereby obtaining and storing recognition information peculiar to the specific user (e.g., at what point one user crosses the "t's" in a word, etc.) and to the creation of the image. This so-called "pen stroke" information provides far more information than a simple bitmap of the overall image.

Clearly, various types of files can be displayed and stored in addition to handwritten images. Facsimiles received by the computer, "imported" bitmaps, pictures drawn by users and interactive forms downloaded from remote sites are just a few examples of computer displays which may be saved for future reference. Since the local pen-based computer preferably does not have a keyboard, pictographic naming is the naming mode for all stored images. User input of the pictographic images, at block 10, is independent of the contents of the file. Processing of the images is transparent to the user, as are the details of opening and displaying the files. The first step, User Input 10, therefore includes the receipt and on-line handwriting processing of the user input.

As a second step to receiving the user input, the computer system may be required to perform a stroke normalization step, at block 12, whereby the initial input sequence of points is processed for conversion into a different coordinate system or rotation into a canonical orientation, if necessary. As an example, stroke normalization may be necessary if a user has input a graph with the input surface oriented horizontally (e.g., 11"×8½") for more y-axis input space. As will be recognized by one having skill in the art, stroke normalization may facilitate further processing but is an optional step which can be programmed in at the developer discretion.

After user input, and the optional stroke normalization step, the Feature Extraction step, illustrated at block 14, can be conducted. The sequence of input points, and/or the normalized sequence of input points, is processed to output a sequence of features. Features may be the spatial location or number of points, as input, but may further include velocity, direction, or curvature information, as perceived by the on-line handwriting processing program resident in the computer. The sequence of features of the processed pictographic image is then provided to the Pictographic Name Database, 18 in the same or a different location as the image is stored.

Further processing at this storage stage may be performed whereby the input and processed pictographic image is matched to other images which have previously been stored in the Pictographic Name Database, 18, according to the chosen matching algorithm, or algorithms. In the optional Pictographic Matching step 16, the sequence of features of the newly input image may be assigned a value according to criteria indicative of the image itself, or may be compared or matched to the sequences of previously stored images and assigned comparative values, e.g., distances from other stored images representative of similarities and/or differences, and the assigned values stored for each of the images. Non-comparative value assignment can, clearly, be conducted during the Feature Extraction step and mere ordering of values performed at the matching step when using simple matching algorithms. In either instance, future retrieval is facilitated since some degree of valuation and/or ordering by features has already been conducted.

For comparative valuation, Pictographic Matching step, 16, receives input of the sequence of features, along with those of a set of previously stored pictographic names. The purpose of a comparative step is to compare the incoming sequence of features with those of the images stored in Database 18. Upon input, or pictographic name storage, it is not absolutely necessary to perform matching or ordering of stored images. Pictographic Matching will necessarily be performed during retrieval of an image, requiring matching of stored images to a reproduced image. The comparative valuation can, however, facilitate the later retrieval if stored images are provided to storage with some comparative order information.

Pictographic Matching is further conducted when the user wishes to retrieve a file. As detailed in FIG. 2, the user reproduces, or attempts to reproduce, at step 20, the file name using an input device. The input device may be the same or different from the one with which the name was created. The computer scans the reproduced image, at 21, and extracts data, at 22, from the reproduced image. Clearly, steps 20–22 are occurring virtually simultaneously as the on-line handwriting processing program receives and processes the user input. A stroke normalization step may also be conducted at this time, particularly when the reproduced image is created using a different input device than was used to create the stored file names. The selected spatial and temporal data which have been extracted from the input reproduced image are then compared, as the sequence of features were optionally compared in the Pictographic Matching step of the storage process flow, to the stored sequences of image features in the Pictographic Naming Database 18.

Figure 2:
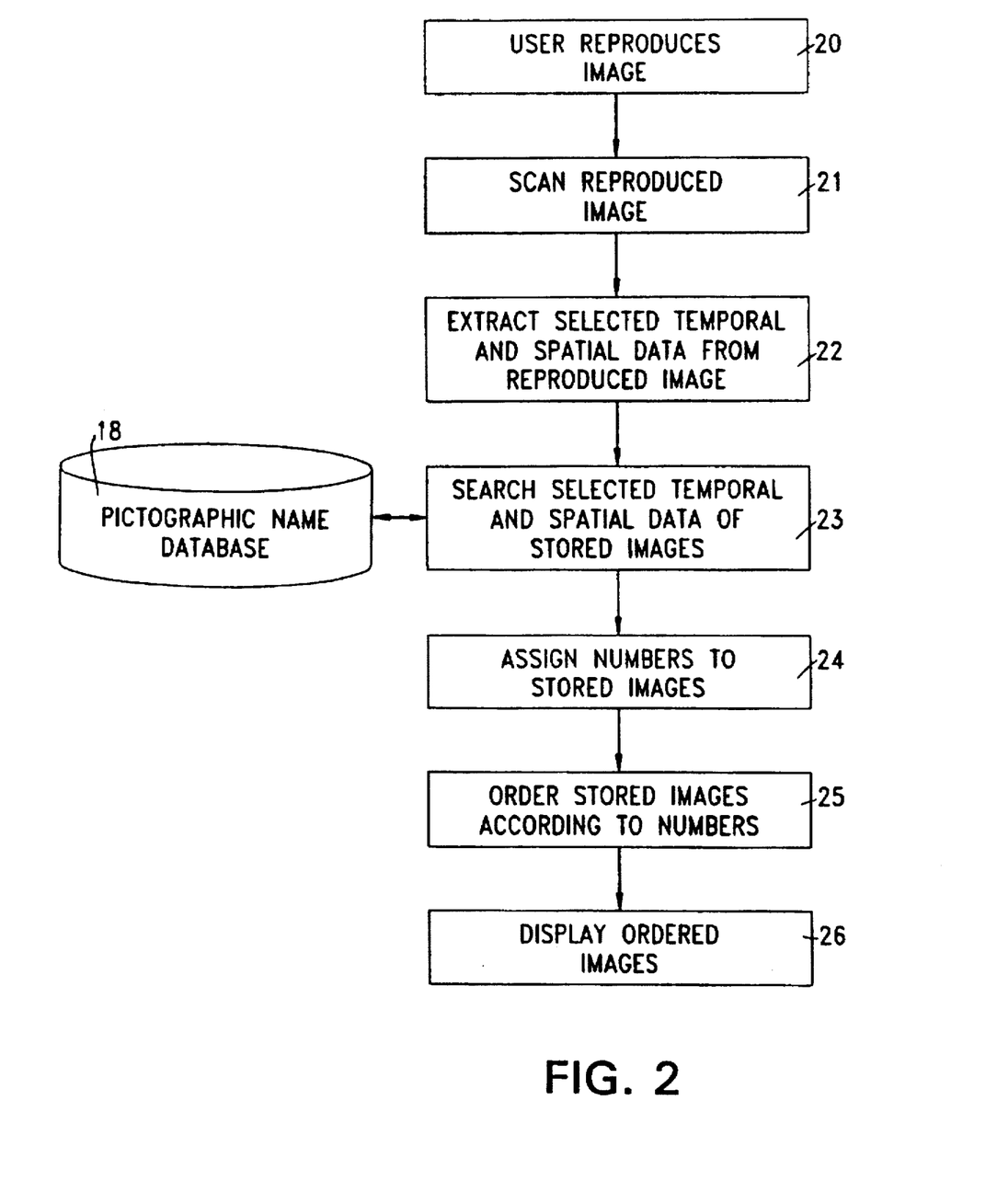
FIG. 2 provides a flow-chart of representative steps for retrieval of pictographic file names.

Depending upon the similarity of the sequences of features for respective images, all of the stored images are assigned values, at step 24, in accordance with the matching algorithm. Ordering or ranking of the images is then conducted, at step 25, in the order of the assigned values. Highly similar images will, necessarily, be more highly ranked in the ordered images. The ordered images are then displayed, at step 26, for user perusal. The user may "page through" the ordered images using a document browser and thereby locate the name of the desired file or document. Document browser programs are well-known as implemented with mouse-based systems' graphical user interfaces and are readily adaptable to the present invention.

Figure 3:
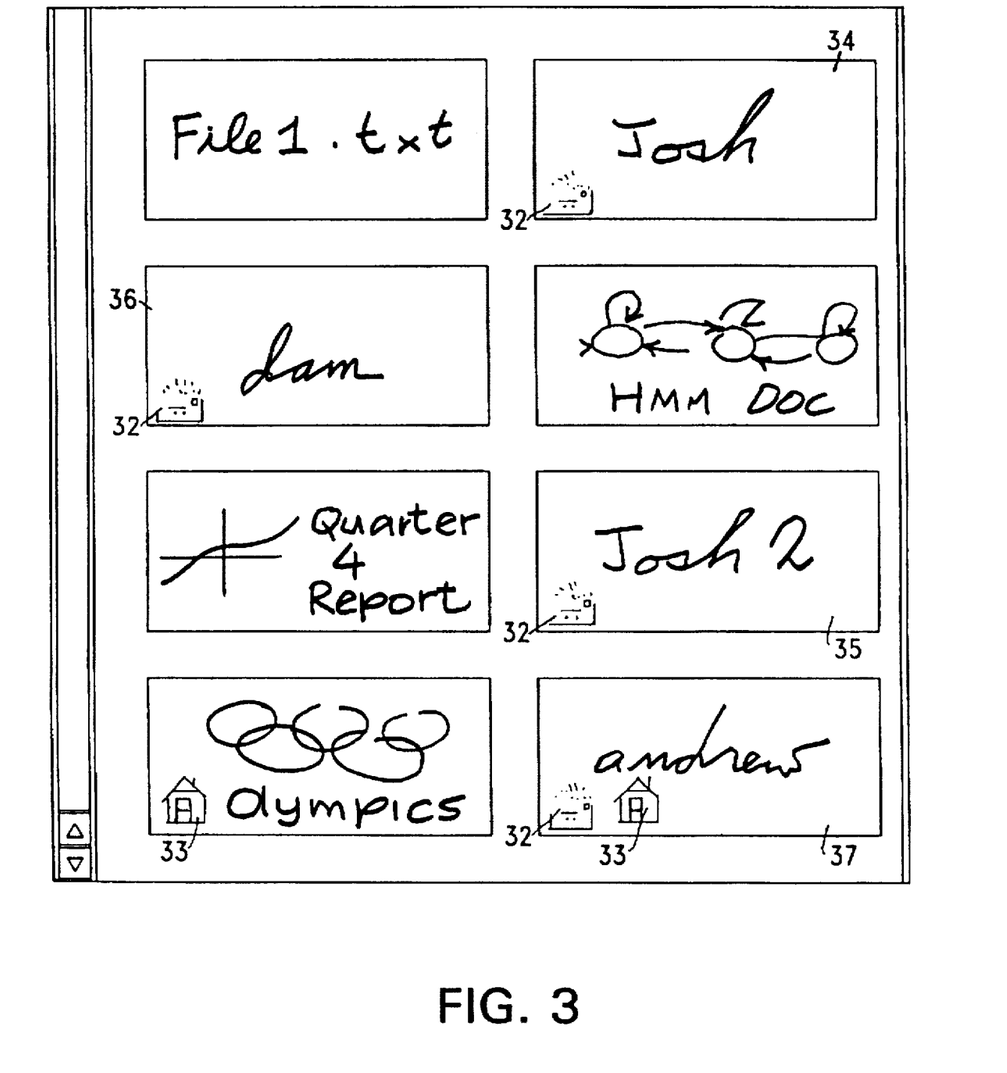
FIG. 3 illustrates pictographic entries in a document browser, including icon annotations thereto, in accordance with the present invention.

As noted above, user recognition of the pictographic name is the primary retrieval technique. The pictographic names are readily recognizable; however, the names are not readily reproducible in exactly the form as originally entered. The computer must, therefore, search and order approximate matches to the reproduced image and provide them for user perusal and recognition via the document browser, as is schematically illustrated in FIG. 3.

The present invention can incorporate several ways in which to use information which is already available, or can be readily provided, to the system in order to facilitate the retrieval of file at a later time. At a minimum, traditional operating systems can be made to supply the size, date and time of creation/saving of a file, which information can be searched when the computer is gathering the bank of pictographic images through which the user will browse. The user may, upon retrieval, enter not only the reproduced image but also, for example, such time and date information as can be accurately recalled. If the computer is programmed to order the files according to the saved time/date information, the number of documents through which the user must browse can be greatly reduced by limiting the search with the time/date information.

In addition to information which is available to the system when the file is created, the user may supply further information to facilitate retrieval. Much like the ASCII text file name extensions which are used to identify the type of file, e.g. the "txt" extension in the file name "file.txt", the user may annotate the pictographic file name with an "extension". Since the user has access only to a pen or pen-like input device, this functionality can be realized by selecting an icon from a bank of custom icons resident in the computer system. As an example, if the user has created a file which is one in a continuing series of reports on buildings, the user may instruct the computer to bring up a palette of icons from which the user will select the pre-scanned image of a building to be included with the pictographic name. The icon will be added to the pictographic image in a non-intrusive manner such as is illustrated for several stored images at 33 in FIG. 3. Moreover, those file names having specified icons can be searched independent of the contents of a reproduced image, by selecting the icon when the system is in the retrieval mode, or can be searched in conjunction with a matching search based upon the features of a reproduced image.

Images 34–37 include, with the pictographic names of the files, an icon of a letter, at 32, indicating to the user that the contents of the so-annotated files are letters. Pictographic names 34 and 35 have not only the same icon of a letter, at 32, but also have highly similar images, Josh and Josh2 respectively. The user may opt to input and save a new handwritten representation of the contents of the file each time a related file is created; or, may use part of the originally created image when naming a subsequently created related file. In the latter manner, the original pictographic image is copied and altered, by erasure or by the addition of information, for example. Later retrieval of the related documents can be greatly enhanced irrespective of the specific matching algorithm which is employed, as will be further detailed below.

The Pictographic Matching step, which was discussed with reference to FIGS. 1 and 2, may incorporate one or more of a variety of matching techniques adapted from that which is familiar to one having skill in the art. Using one simple function, the computer can generate a point count of the number of black pixels in the name and compares the point counts for images to be matched. Clearly, the point count system is not very accurate for processing of highly arbitrary images, but may be effective as a "first cut" for reducing the size of the relevant database to be searched.

Another approach uses the pen stroke information accumulated by the on-line handwriting processing program. For example, the average direction or velocity of the pen strokes and/or the average number of changes of direction or velocity manifested when creating the image can be stored and later accessed during the retrieval process. Another broad identification function is for the computer to assign a hash value to each stored image, whereby documents are compressed or hashed to small integers, either as a function of the pen strokes or as a random distribution. If the user knows the single integer hash value, then the document can be retrieved easily. Incremental hash values assigned to portions of the pictographic images have an application which will be further discussed below.

Figure 4:
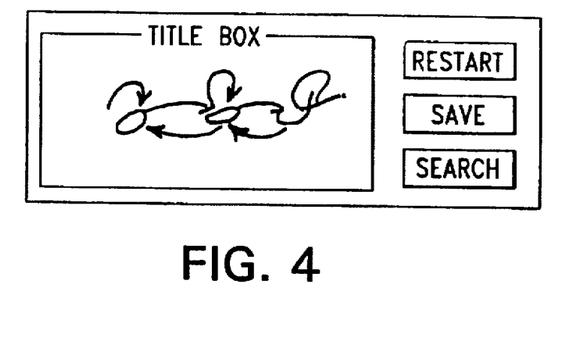
FIG. 4 illustrates a reproduced image, or search string, to be matched to stored images for retrieval of a stored file name.
Figure 5:
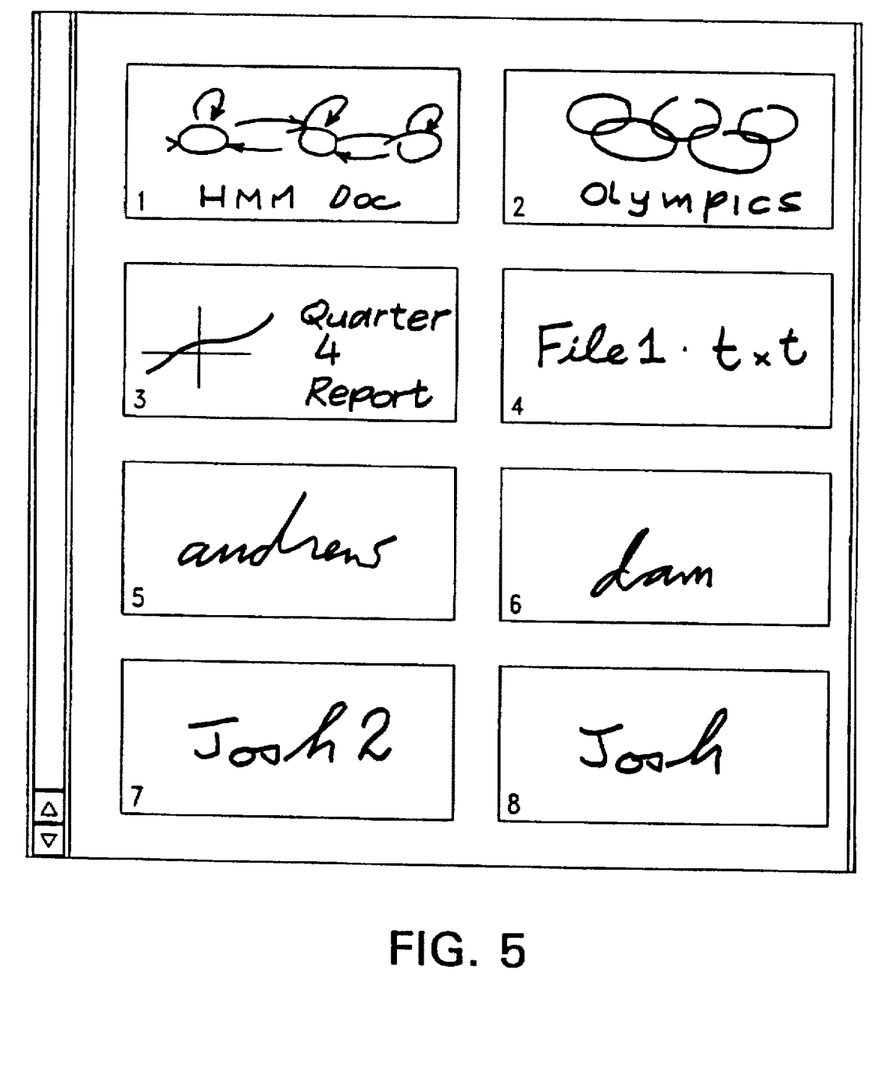
FIG. 5 illustrates the pictographic entries of FIG. 3 upon ordering of same based upon similarity to the reproduced input of FIG. 4.

Another possible recognition and matching process would be the application of Hidden Markov Models (HMM's) to the image matching, which application is particularly effective for cursive script and related image (i.e., chain) processing. HMM models have been addressed in the art, for example in "An Introduction to Hidden Markov Models", by L. R. Rabiner and B. H. Juang, *IEEE ASSP Magazine*, pages 4–16 (January, 1986). As applied, the HMM method of processing the reproduced image, or search string of FIG. 4, to retrieve approximate matches would result in the re-ordering of the names illustrated in FIG. 3 to that illustrated in FIG. 5. Even without the "HMM Doc" detail of the original name being provided in the reproduced image of FIG. 4, the HMM approach is powerful enough to recognize the remaining similarities and to re-rank the stored names in accordance with their similarity to the search string. The intended match is shown as ranked first, while the somewhat similar looking "Olympics" name was ranked second. An advantage to the HMM approach is that a search string which does not correspond point-to-point to the stored target name can still be matched by the time and space warping properties of the HMM's.

Wildcard searches may also be conducted if the user chooses to alter an existing file name when storing a new file name, specifically when the contents of the files are related. As illustrated in FIG. 3, the Josh and Josh2 files, 34 and 35, have a common pictographic prefix. The related file names are created, as noted above, by effecting alterations to a representation of the original file name when entering new file names. As a result, a portion of the pen stroke sequence information for the related names will be identical. Unlike the approximate matching problem, therefore, exact sequence matching can be conducted. If incremental hash values have been assigned to the prefixes and stored with the file names, a search can be rapidly conducted since all related file names will have the identical hash value assigned to the increment, or prefix, portion thereof. Input of a reproduced image or input of the hash value, if known, will bring up all of the related file names to the document browser. It is clear from the HMM reordering illustrated in FIG. 5 that similar prefix file names will also generally be proximate each other upon application of most matching schemes and could be rapidly scanned as a result.

Yet another approach has been implemented and tested, which for present purposes is dubbed "the Window Algorithm". Ideally, the same picture drawn twice by the same individual would line up point-for-point, and the similarity could be readily measured by adding the distances between the corresponding points. However, since for most pictures, the points are not likely to correspond so closely, a method has been devised for approximating the point correspondence. First, curves are compressed down to a small number of points. Next, the two compressed curves are permitted to "slide" along one another and the correspondence noted. Given two sequences p and q, each resampled to contain N points, and an integer; representing the maximum tolerable slide between images, the distance between the images is defined as:

$$D(p,q) = \sum_{i=1}^{N} \left( \sum_{\delta=-\Delta}^{\Delta} \omega_\delta d(p_i, q_{i+1}) \right)$$

It is assumed that the point-wise distance function d returns 0 for the boundary conditions in which $i+\delta \in [1 \ldots N]$. The values for $\omega_\delta$ are a parameter such as $1/(|\delta|+1)$.

The procedure is similar to the dynamic programming used in template matching character recognition systems, which are well documented in the art and readily adapted to the present application. However, the present algorithm is computationally more efficient and permits the assumption that given two similar sequences p and q, there is some expected similarity between $p_i$ and all of $\{q; -1, q; . q; +1\}$.

Results of a test using the window algorithm are given in Table 1. In the test, each of four users created a data base of sixty names. The first database was in Japanese and the last three databases in English. Each subject subsequently redrew each of the sixty names three times to create a 180-word test set. For each element of the test set, the windowing method was used to select and rank the eight most similar looking names in the data base. On average, the operation took 0.33 seconds to complete for each element of the test set. The table shows the frequency with which the correct name was ranked in the eight choices ("Ranked in Top 8") and how often the correct name from the database was ranked first among the eight choices ("Ranked First").

TABLE 1

| Success percentages of the Windowing algorithm | | | | | |
|---|---|---|---|---|---|
| Database | 1 | 2 | 3 | 4 | All |
| Ranked First | 97% | 83% | 94% | 88% | 90.5% |
| Ranked In Top 8 | 100% | 95% | 99% | 98% | 98% |

As will be apparent to one having skill in the art, a combination of techniques may be implemented to facilitate ordering and/or matching. As an example, if a point count integer is assigned to each input image, a first ordering can be conducted based upon the integers. Upon narrowing the search with the point-count information, the system may then evaluate the similarities among images based upon distance values derived from comparisons of location and/or velocity data. Finally, an HMM or window algorithm may be applied to further narrow the number of images to be provided to the document browser and to order same.

In summary, the present invention provides a unique system and method for computer creation, storage and retrieval of files and file names. Existing processing techniques and combinations thereof have been incorporated and/or adapted for use with the inventive system. Further modifications to the system may be envisioned by one having skill in the art without departing from the spirit and scope of the appended claims.

What is claimed is:

1. A method for creating a computer file wherein said computer comprises at least input means and processing means and wherein said input means comprises at least a digitizer and a stylus for inputting handdrawn information onto said digitizer comprising the steps of:

user inputting of the content of said file to said computer;
   storing said file in said computer;
   user inputting of a handdrawn mnemonic, representation of said file onto said digitizer with said stylus;
   converting said handdrawn mnemonic representation to digitized data in the form including at least one bitmap having a length sufficient to represent said handdrawn mnemonic representation; and directly storing at least said at least one bitmap of said handdrawn mnemonic representation as the file name of said file without comparing said bitmap to a prestored character set.

2. The method of claim 1 wherein said inputting steps comprise creating said content and said handdrawn mnemonic representation with said stylus and said digitizer and wherein said storing of said file in said computer comprises receiving digitized content data and directly storing said digitized content data without translation of said content data by comparison of said content data with a prestored character set.

3. The method of claim 1 further comprising identifying a computer-resident icon for storage with said digitized data of said mnemonic representation.

4. The method of claim 1 further comprising:
retrieving said stored file name.

5. The method of claim 4 wherein said computer includes storage means for storing a plurality of file names and display means for displaying a plurality of file names, and wherein said retrieving comprises:
viewing a display of said plurality of file names; and
identifying said stored file name.

6. The method of claim 5 wherein said retrieving further comprises inputting a handdrawn reproduced representation of said stored file name.

7. The method of claim 1 further comprising the step of computer processing said digitized data to obtain processed data and wherein said directly storing further comprises storing said processed data with said digitized data.

8. The method of claim 1 further comprising the step of computer processing said digitized data to obtain processed data and wherein said directly storing comprises storing said processed data in lieu of storing said digitized data.

9. A method for creating and storing at least one computer file for a hand-input computer system, having at least processing means and input means comprising at least a digitizer and a stylus for inputting handdrawn information onto said digitizer, comprising the steps of:

inputting the content of said at least one file to the computer;

storing said at least one file;

inputting at least one handdrawn mnemonic representation of said at least one file onto said digitizer with said stylus;

receiving digitized data representative of said at least one handdrawn mnemonic representation at said processing means from said digitizer;

computer processing said digitized data including at least the steps of forming at least one bitmap of length sufficient to represent said at least one handdrawn mnemonic representation and extracting at least one of spatial and temporal information from said at least one handdrawn mnemonic representation; and directly storing said bitmap representation of said at least one handdrawn mnemonic representation and said extracted information as the file name of said file without comparing said bitmap or said extracted information with a prestored character set.

10. The method of claim 9 further comprising appending said digitized data of said at least one handdrawn mnemonic representation with at least one computer-resident icon and wherein said storing comprises storing said digitized data of said at least one handdrawn mnemonic representation, said at least one appended icon and said extracted information.

11. The method of claim 9 further comprising the steps of:

user inputting a handdrawn reproduction of one of said at least one stored handdrawn mnemonic representation;

converting said handdrawn reproduction to a bitmap of length sufficient to represent said handdrawn reproduction without comparing said bitmap to a prestored character set;

comparing said bitmap representing said handdrawn reproduction to said stored bitmap representing said at least one mnemonic representation; and displaying one or more of said at least one mnemonic representation based upon said comparing.

12. The method of claim 11 further comprising ordering said digitized data of at least one mnemonic representations based upon said comparing and wherein said displaying comprises displaying one or more of said at least one mnemonic representation in said order.

13. The method of claim 12 further comprising computer processing said digitized reproduction data comprising at least extracting spatial and temporal reproduction information from said handdrawn reproduction.

14. The method of claim 13 wherein said comparing comprises comparing said extracted reproduction information from said digitized reproduction data of said handdrawn reproduction to said extracted information from said digitized data of said at least one mnemonic representation.

15. The method of claim 11 further comprising the step of processing said digitized reproduction data comprising extracting information from said digitized reproduction data of said handdrawn reproduction.

16. The method of claim 15 wherein said comparing comprises comparing said extracted reproduction information from said digitized reproduction data of said handdrawn reproduction to said extracted information from said digitized data of said at least one mnemonic representation.

17. The method of claim 11 further comprising the steps of:

associating one of said at least one stored file with one of said displayed at least one mnemonic representation; and displaying said associated file.

18. The method of claim 9 wherein said hand-input computer system comprises at least one of a stylus and a keyboard.

19. A computer system for generation and storage of files each having a file name comprising:

input means for providing a handdrawn input representation of a file name for a file to said computer system;

processing means for digitizing data of said handdrawn input into digital data including at least one bitmap of length sufficient to represent said handdrawn input and for extracting spatial and temporal information from the digitized data of said handdrawn input without comparing said bitmap or extracted information with a prestored character set; and storage means for directly storing said bitmap and said extracted information as a file name.

20. The system of claim 19 further comprising means for ordering said at least one computer file name in order based upon said extracted information.

21. The system of claim 20 further comprising means for providing said at least one file name for display in said order based upon said extracted information.

22. The system of claim 19 further comprising means for comparing extracted information of said handdrawn input to stored extracted information of stored handdrawn input.

23. The system of claim 22 further comprising means for ordering said at least one stored computer file name based upon said stored extracted information.

24. The system of claim 23 further comprising means for providing said at least one stored file name for display in said order based upon said stored extracted information.

25. The method of claim 19 further comprising the steps of:

user inputting a reproduction of said handdrawn input;

converting said reproduction of said handdrawn input to a bitmap of length sufficient to represent said handdrawn input reproduction without comparing said bitmap to a prestored character set;

comparing said bitmap representing said reproduction of said handdrawn input with said stored bitmap representing said handdrawn input; and displaying said stored bitmap representing said handdrawn input based upon said comparing.

26. The method of claim 25 further comprising the steps of:

associating one of said at least one stored file with said displayed stored bitmap representing said handdrawn input; and displaying said associated file.

* * * * *